(12) United States Patent
Ware et al.

(10) Patent No.: US 8,954,461 B2
(45) Date of Patent: Feb. 10, 2015

(54) SYSTEMS AND METHODS FOR OBJECT TO RELATIONAL MAPPING EXTENSIONS

(75) Inventors: Thomas Ware, Ottawa (CA); Douglas Clarke, Ottawa (CA); Chris Delahunt, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 100 days.

(21) Appl. No.: 13/332,110

(22) Filed: Dec. 20, 2011

(65) Prior Publication Data

US 2013/0086118 A1  Apr. 4, 2013

Related U.S. Application Data

(60) Provisional application No. 61/541,952, filed on Sep. 30, 2011.

(51) Int. Cl.
  *G06F 7/00* (2006.01)
  *G06F 17/30* (2006.01)

(52) U.S. Cl.
  CPC .... *G06F 17/30569* (2013.01); *G06F 17/30607* (2013.01)
  USPC ....................................................... 707/760

(58) Field of Classification Search
  USPC ....................................................... 707/760
  See application file for complete search history.

(56) References Cited

U.S. PATENT DOCUMENTS

| | | | |
|---|---|---|---|
| 5,937,409 A * | 8/1999 | Wetherbee | 1/1 |
| 6,134,559 A | 10/2000 | Brumme et al. | |
| 6,633,889 B2 | 10/2003 | Dessloch et al. | |
| 6,912,520 B2 | 6/2005 | Hankin et al. | |
| 6,999,956 B2 | 2/2006 | Mullins | |
| 7,526,490 B2 | 4/2009 | Doughan | |
| 7,536,409 B2 | 5/2009 | Barcia | |
| 7,565,376 B2 | 7/2009 | Stegmann et al. | |
| 7,653,651 B1 | 1/2010 | Pavlov | |
| 7,689,535 B2 | 3/2010 | Bernard | |
| 7,694,293 B2 | 4/2010 | Rao | |
| 7,702,649 B1 | 4/2010 | Bresch et al. | |
| 7,739,223 B2 | 6/2010 | Vaschillo et al. | |

(Continued)

OTHER PUBLICATIONS

King et al., "Hibernate Reference Documentation 3.3.2.GA" published Jun. 24, 2009. Available at <http://docs.jboss.org/hibernate/orm/3.3/reference/en-US/html/>. 342 pages.

(Continued)

*Primary Examiner* — Truong Vo
(74) *Attorney, Agent, or Firm* — Meyer IP Law Group

(57) ABSTRACT

Generally, an application provider can use their understanding of the general problem domain to design an application that covers the majority of the functionality that is required by application users, e.g., the types and quantities of data that are required by an application and which are typically gathered and stored. By configuring the application with flexible data structures which can be mapped to a variety of different types of data by the application user, the application can be customized by the application user to meet his or her specific needs. When the application user wants to expand the data set that is stored by the application beyond what the application provider has provided, they can make use of a management interface to add mappings for custom attributes to the flexible data structures. The application users are not required to write any additional code or modify the application directly.

20 Claims, 6 Drawing Sheets

(56) References Cited

U.S. PATENT DOCUMENTS

| | | | |
|---|---|---|---|
| 7,870,146 B2 | 1/2011 | Babb et al. | |
| 7,873,611 B2 | 1/2011 | Ebersole | |
| 7,984,082 B2 | 7/2011 | Heider et al. | |
| 8,260,643 B2 | 9/2012 | Benayon et al. | |
| 8,266,576 B2 | 9/2012 | Lam et al. | |
| 8,571,404 B2 | 10/2013 | Jo et al. | |
| 8,706,800 B1 | 4/2014 | Ahmed et al. | |
| 2003/0046266 A1 | 3/2003 | Mullins et al. | |
| 2003/0110279 A1* | 6/2003 | Banerjee et al. | 709/232 |
| 2005/0234931 A1 | 10/2005 | Yip et al. | |
| 2005/0262475 A1 | 11/2005 | Halpern | |
| 2006/0294493 A1 | 12/2006 | Melby | |
| 2007/0198564 A1 | 8/2007 | Blackstone et al. | |
| 2007/0271210 A1 | 11/2007 | Heider et al. | |
| 2007/0288892 A1 | 12/2007 | Foti | |
| 2008/0162483 A1 | 7/2008 | Becker et al. | |
| 2008/0320441 A1 | 12/2008 | Ahadian et al. | |
| 2009/0112908 A1* | 4/2009 | Wintel et al. | 707/102 |
| 2009/0204961 A1 | 8/2009 | DeHaan et al. | |
| 2009/0281982 A1 | 11/2009 | Nigul et al. | |
| 2010/0122239 A1 | 5/2010 | Neufeld et al. | |
| 2010/0161648 A1* | 6/2010 | Eberlein et al. | 707/769 |
| 2010/0287208 A1 | 11/2010 | Mao et al. | |
| 2011/0145194 A1* | 6/2011 | Figus et al. | 707/636 |
| 2011/0153576 A1* | 6/2011 | Figus | 707/692 |
| 2011/0154253 A1* | 6/2011 | Lehr et al. | 715/810 |
| 2011/0321010 A1 | 12/2011 | Wang | |
| 2012/0023067 A1 | 1/2012 | Clegg et al. | |
| 2012/0284234 A1 | 11/2012 | Mashtizadeh et al. | |
| 2012/0324419 A1 | 12/2012 | Roberts et al. | |
| 2013/0117346 A1* | 5/2013 | Figus | 709/201 |
| 2013/0219060 A1 | 8/2013 | Sturgeon et al. | |

OTHER PUBLICATIONS

Soffiato et al., "Using Existing Hibernate Data Models and Multi-Tenant plugin", published Sep. 20, 2010, 1 page.

Rekadze et al. "Oracle Fusion Middleware Developer's Guide for Oracle TopLink, 11g Release 1(11.1.1)" published Sep. 2008, 1470 pages.

* cited by examiner

400 | Customer
    @Id id
406 |    @Basic name
    @OneToMany Orders

402 | Order
    @Id id
    @OneToOne Item
408 |    @Basic quantity
    @ManyToOne customer 404 | Item
    @Id id
410 |    @Basic name
    @Basic unitPrice

FIGURE 4

500 | CUSTOMER
    INTEGER ID
506 |    VARCHAR NAME

502 | ORDER
    INTEGER ID
    INTEGER ITEM_ID
508 |    INTEGER QUANTITY
    INTEGER CUST_ID

504 | ITEM
    INTEGER ID
510 |    VARCHAR NAME
    FLOAT PRICE

SYSTEMS AND METHODS FOR OBJECT TO RELATIONAL MAPPING EXTENSIONS

CLAIM OF PRIORITY

This application claims benefit to the following U.S. Provisional Patent Application: U.S. Provisional Patent Application No. 61/541,952 entitled "SYSTEMS AND METHODS FOR OBJECT TO RELATIONAL MAPPING EXTENSIONS," by Thomas Ware et al., filed Sep. 30, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to an application server environment and to the persistent extensibility of software applications in the application server environment, and is particularly related to systems and methods for object to relational mapping extensions.

BACKGROUND

EclipseLink is an object-persistence and object-transformation framework that provides development tools and run-time capabilities which can reduce development and maintenance efforts, and increase enterprise application functionality. An implementation of the Java Persistence API (JPA) framework is provided by EclipseLink, which enables java classes and objects to be stored in data sources, allowing information to be used across sessions. EclipseLink also provides an implementation of the Java Architecture for XML Binding (JAXB) framework, which enables java classes and objects to be transformed to/from Extensible Markup Language (XML) nodes. Using EclipseLink, software applications can be built which store persistent object-oriented data in a relational database; and can be used to transform object-oriented data into either relational data or Extensible Markup Language (XML) elements.

Software application development in EclipseLink can be divided between an application provider, who provides the base application, and an application user, who uses the base application and/or tailors it further to meet their needs. Typically, the application provider develops the bulk of the application and the application user can make certain types of modifications to that application. Such division of development is associated with different skills possessed by each actor. For example, the application provider may have stronger Java development and database development skills, while the application user has specialized knowledge of their own particular needs and how they would like to tailor or extend the application to meet those needs. Typically the application user does not possess the same degree of Java and database skills as the application provider.

SUMMARY

Generally, a software application provider can use their understanding of a general problem domain to design an application that covers the majority of the functionality that is required by application users, e.g., the types and quantities of data that are required by an application and which are typically gathered and stored. By configuring the software application with flexible data structures which can be mapped to a variety of different types of data by the application user, the application can be customized by the application user to meet their specific needs. When the application user wants to expand the data set that is stored by the application beyond that provided by the application provider, they can make use of a management interface to add mappings for custom attributes to the flexible data structures. The application users are not required to write any additional code or modify the application directly.

BRIEF DESCRIPTION OF THE FIGURES

FIG. 4 shows an example of provider-defined entities, in accordance with an embodiment.

FIG. 5 shows an example of a provider-designed database schema, in accordance with an embodiment.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Generally, a software application provider can use their understanding of the general problem domain to design an application that covers the majority of the functionality that is required by application users, e.g., the types and quantities of data that are required by an application and which are typically gathered and stored. By configuring the application with flexible data structures which can be mapped to a variety of different types of data by the application user, the application can be customized by the application user to meet his or her specific needs. When the application user wants to expand the data set that is stored by the application beyond what the application provider has provided, they can make use of a management interface to add mappings for custom attributes to the flexible data structures. The application users are not required to write any additional code or modify the application directly.

Figure 1:
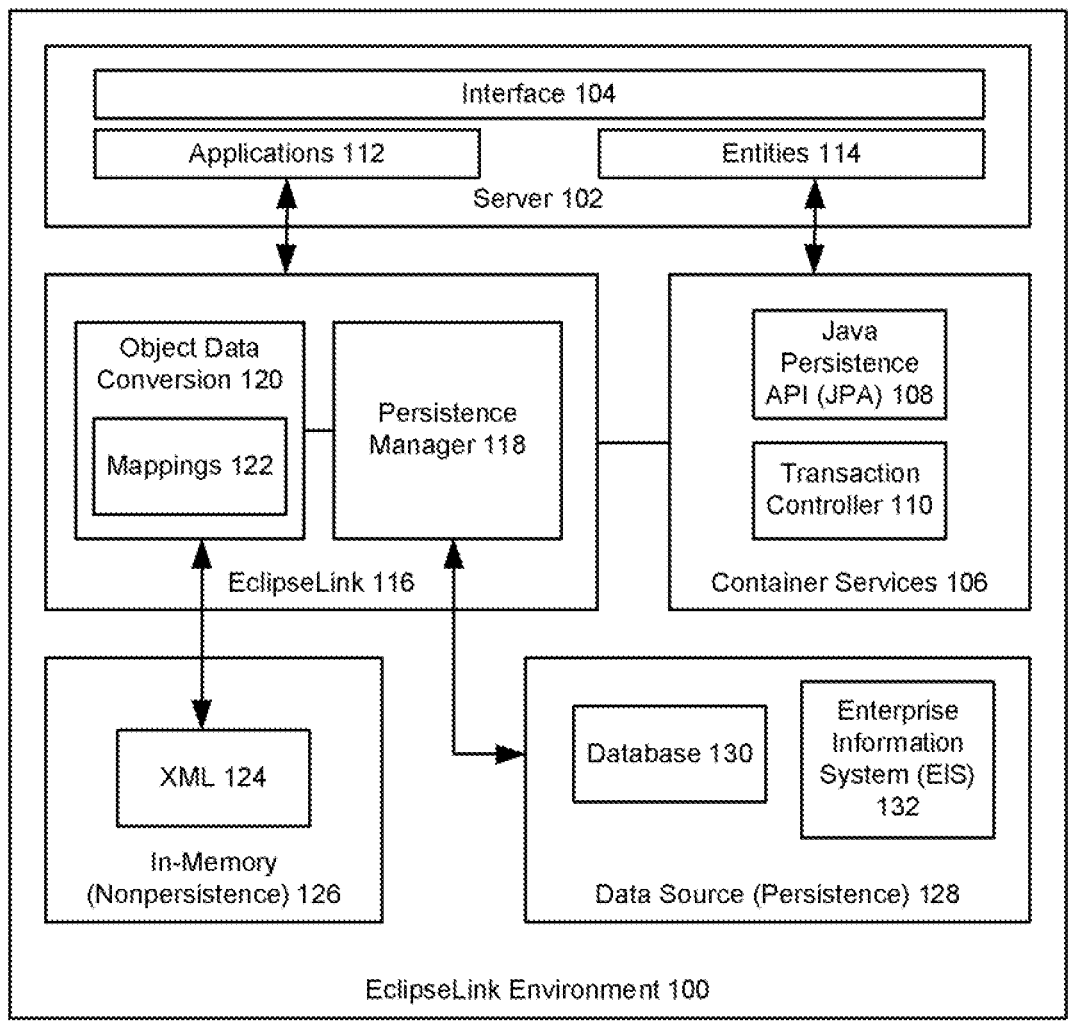
FIG. 1 shows an illustration of an EclipseLink environment, in accordance with an embodiment.

FIG. 1 shows an illustration of an EclipseLink environment, in accordance with an embodiment. As noted above, persistent applications can be developed using EclipseLink. As shown in FIG. 1, the EclipseLink environment 100 can include a server 102, which includes an interface 104 through which the EclipseLink environment can be accessed, and a plurality of container services 106 such as an implementation of the Java Persistence API (JPA) 108 and a transaction controller 110. The implementation of the Java Persistence API (JPA) framework, provided by EclipseLink, enables applications 112 to define objects that are to be made persistent. In JPA, these application-defined objects are called entities 114. Entities have persistent identities (i.e., instances can be uniquely identified and distinguished from one another); and are transactional (i.e., an entity is created, updated and deleted within a transaction, and a transaction is required for the changes to be committed in the database). However, in-memory entities can be changed without the changes being persisted. Additionally, an entity is a fine-grained object that has a set of aggregated state that is typically stored in a single place (such as a row in a table), and has relationships to other entities.

Entities can be described using metadata, which can be expressed as annotations (specifically defined types that can be attached to or placed in front of Java programming elements) or in XML (descriptors). An entity manager enables API calls to perform operations on an entity. Until an entity manager is used to create, read, or write an entity, the entity is just a regular nonpersistent object. When an entity manager obtains a reference to an entity, that entity becomes managed by the entity manager. The set of managed entity instances within an entity manager at any given time is called its persistence context. The entity manager can be configured to persist or manage certain types of objects and read or write to a particular data source. Entity managers can be provided by an entity manager factory which can be configured by a persistence unit. Persistence units can be named to allow differentiation between the entity manager factory objects with which they are associated. This way an application obtains control over which configuration to use for operations on a specific entity. Persistence units can be defined in a persistence.xml file.

The EclipseLink environment also includes a persistence manager 118 and an object data conversion module 120, and can be used with a variety of Java architectures. As shown in FIG. 1, a plurality of mappings 122 can be maintained to XML representations 124 stored in memory 126. The persistence manager can communicate with one or more data sources 128 such as a database 130 or Enterprise Information System (EIS) 132. Relational databases can be used for transactional persistence of Java objects using Java Database Connectivity (JDBC) drivers. An EIS can be used for transactional persistence of Java objects to a nonrelational data source accessed using a Java EE Connector architecture (JCA) adapter, and any supported EIS record type, including indexed, mapped, or XML.

Application Extension Using Object to Relational Mapping

Generally, an application provider can use their understanding of the general problem domain to design an application that covers the majority of the functionality that is required by application users, e.g., the types and quantities of data that are required by an application and which are typically gathered and stored. That application can include a persistence component that maps the data required for the application. That persistence component can be mapped in a Java Persistence API (JPA) persistence unit. The application provider can provide both the application, and an interface that allows the application user to extend the data in the persistence unit. When the application user wants to store additional types of data, which have not been provided as part of the default data set, they can extend the data set and customize it to meet their needs. The application user can access the management interface and extend the data set by adding mappings in the persistence unit provided by the application provider. The application users are not required to write any Java code, SQL, or other coding, and are not required to redeploy the application on the application server.

Figure 2:
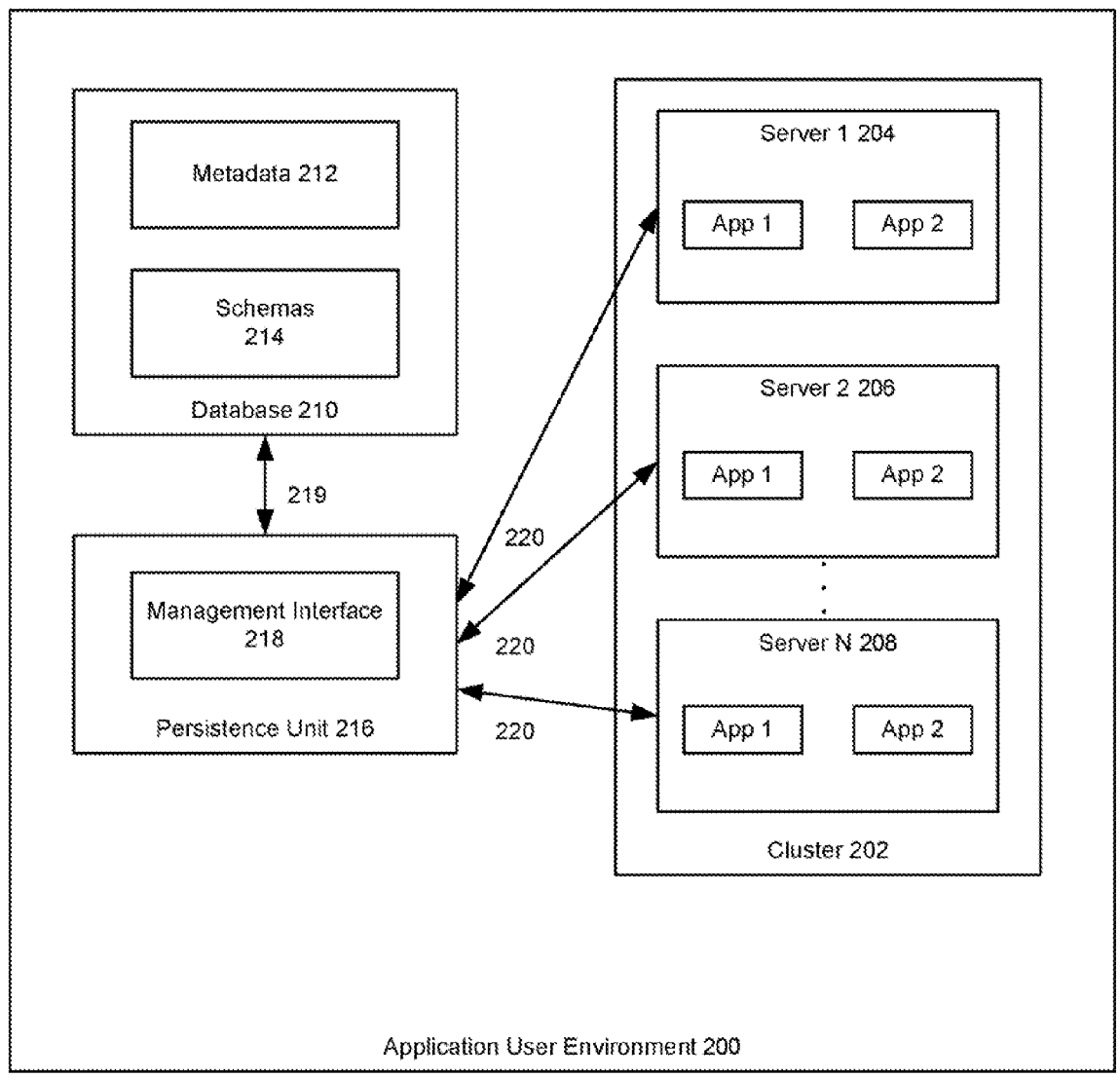
FIG. 2 shows an extensible application user system, in accordance with an embodiment.

FIG. 2 shows an extensible application user environment, in accordance with an embodiment. The example shown in FIG. 2 is provided for purposes of illustration, and is not intended to be restrictive in any way. As shown in FIG. 2, the application user environment can include a plurality of servers (Server 1 204-Server N 208), and each server can include one or more applications (App 1 and App 2). In accordance with an embodiment, one or more of the plurality of servers can be arranged in a cluster 202.

Each application can be received from an application provider which defines the default name and type of data the application is configured to receive and manipulate, metadata, and schema for the application. A database 210, accessible to the plurality of servers (and/or cluster), can be used to store metadata 212 and schemas 214 for each of the applications. These can be stored in separate tables or shared tables within the database.

Additionally, the applications can be configured with a persistence component which is mapped to a persistence unit 216 and which includes a management interface 218. The management interface can be used by the application user to extend the application beyond the default data setup by the application provider, to include data having different labels and types. This way, the application user can customize the application for his or her particular needs, without having to manipulate the application's code, or redeploy the application. Through the management interface, the user can define the extensions for the application and store 219 the extensions definitions with the application's metadata in the database. The data itself can then be stored in the application's schema, or in separate tables, depending on the manner in which application extensibility has been provided.

In accordance with an embodiment, database tables can be shared or stored in separate schemas, accessible to the servers in the cluster. Additionally, the same persistence unit can be used 220 by multiple servers. This persistence unit can be used by the same application, or by separate applications. Database schema can be shared or specified by each server. In accordance with an embodiment, when an entity manager is created at an application, the user can define extensions for additional types of data to be added to the data set. An entity manager can include constructs that let it make use of extended mappings that are not accessible to the entity manager factory used to create the entity manager. The entity manager enables the application to interface with the persistence unit. Database schema can be shared or specified at entity manager creation time.

In accordance with an embodiment, application providers can define and use extensible entities where mappings can be added dynamically. This extensibility can include the entity storing extended attributes within a map instead of static attributes and then defining how values from this map are mapped to the database using a mapping file. In addition to being able to dynamically define mappings, these extended mappings can be stored and managed externally. This external storage allows the extended mappings to be defined while the application is running.

Extensible Entity Types

In accordance with an embodiment, an application user can start with a persistence unit containing entity types that are configured to support extensions, and add mappings to the entities in that persistence unit without redeploying the persistence unit or the application. These extended entities can then read and write the extended values when set, and enable the application to execute queries involving these properties in the criteria. Different types of extensions can be provided, including static extensions which are defined for the extensible entity types prior to the application starting, and dynamic extensions which are defined while the application is operating.

In accordance with an embodiment, application providers can develop and map a persistent entity type that supports static and/or dynamic extensions where the extensions are additional properties on the entity type that are read and written with the entity. Flexible storage supports storage of the extension properties within the same table using existing columns or dynamically added columns. Values storage supports storage of the extension values within a secondary table where each row is a value for its associated entity.

In accordance with an embodiment, extension definitions can be shared among the instances of a particular application deployed in a cluster. Additionally, extension definitions can be persisted so that future instances of the application can also use the extensions. In accordance with an embodiment, this can be provided using XML, using an object-relational mapping (ORM) file or fragment, or in a relational database in which the definitions can be stored within the application's schema. Extension definitions can be defined statically or dynamically using an API.

In accordance with an embodiment extensions can be exposed through Java Persistence API (JPA) queries and metamodel. The JPA metamodel (and underlying native metamodel) can expose the extensions and an API can allow static and dynamic extension properties to be differentiated. Applications can leverage extensions in queries using native expressions, JPQL, and String based criteria queries.

Application Development Using Extensibility Feature Set

Figure 3:
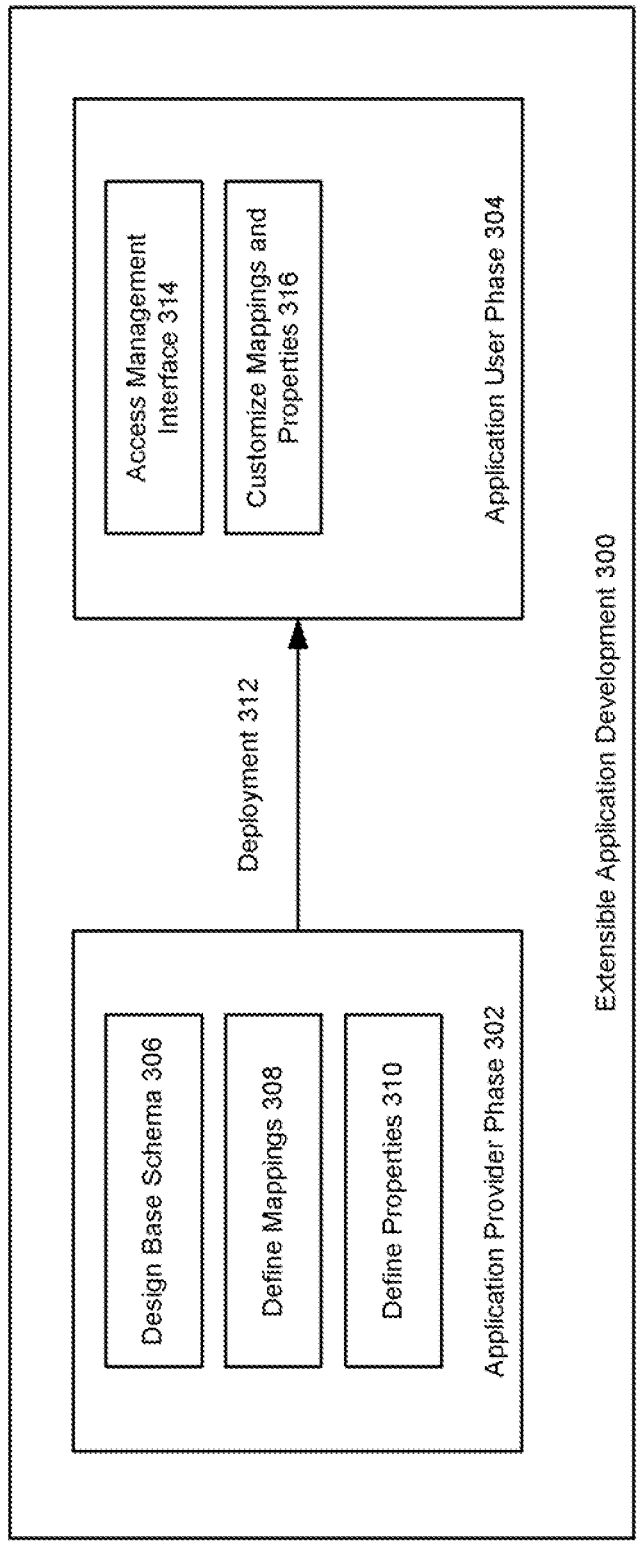
FIG. 3 shows a method of application development, in accordance with an embodiment.

FIG. 3 shows a method of application development, in accordance with an embodiment. As shown in FIG. 3, application development 300 can include different phases, including an application provider phase 302 and an application user phase 304. During the application provider phase of design, the base schema 306, mappings 308, and properties 310 of the persistence unit are defined. These parts of the persistence unit will exist for all running instances of the application. Once the application and persistence unit have been deployed 312 to the application user's system, the application user can access 314 the management interface of the persistence unit, and customize 316 the mappings and properties of the persistence unit as needed. Each phase is discussed in further detail below.

Application Provider Phase

During the application provider phase of application design, in accordance with an embodiment, a persistence unit design can further include: additional tables in the schema; additional columns to tables in the schema; additional privileges for schema alteration; and specification of which entities are extensible.

FIG. 4 shows an example of provider-defined entities, in accordance with an embodiment. As shown in FIG. 4, a user has defined three entities, including a customer 400, order 402, and item 404 entity. The Customer entity includes several attributes 406, including ID, Name and Orders. Similarly, the Order entity includes attributes 408 ID, Item, Quantity and Customer; and Item includes attributes 410 ID, Name and Unit Price. Each mapping can be made using JPA annotations, orm.xml or a combination. A persistence.xml file can be provided to configure the persistence unit.

FIG. 5 shows an example of a provider-designed database schema, in accordance with an embodiment. As shown in FIG. 5, after a user has defined one or more entities, as shown in FIG. 4, the user can design a database schema to hold those entities. In this example, the database schema can include three tables: Customer 500, Order 502, and Item 504 each corresponding to the entities shown in FIG. 4. The schema can include additional columns in those tables, or additional tables, depending on how the user chooses to provide extensibility. Each table includes entries (506-510) corresponding to the attributes defined for each entity in FIG. 4. Each of the entries defines a type (for example, integer or varchar) and a label or name (such as cust_ID or quantity), depending on what sort of data will be stored in the schema.

In accordance with an embodiment, once the persistence unit is assembled and deployed, an interface is provided for actual application use, and a management interface can also be provided to allow extension of the persistence unit by a user.

In accordance with an embodiment, a method of enabling dynamic extension of application properties can include selecting an application, such as a Java Persistence API application, to be extended. The method can further include identifying entities within that application which are enabled for flexible mappings, annotating the selected entities, and designing a schema to store the mapping data. In accordance with an embodiment, designing the schema to store the mapping data can include providing additional columns and/or additional tables to accommodate the flexible mappings. The method can then include deploying the application, storing the flexible mappings in a file or database entry, and providing an address of the file or database entry to a persistence unit.

Application User Phase

In accordance with an embodiment, the application user phase of design can include customization of the persistence unit. With the persistence unit already deployed, a user performing customization can add mappings to the persistence unit. Because the schema has been designed to accommodate the new mappings, the user can either make use of predefined tables and columns to store the data for the mappings, or alter the schema to add new columns to existing tables. This way, new attributes can be added to already deployed persistence units, without requiring the persistence units to be redeployed.

A user can customize a deployed persistence unit by, e.g., adding a new attribute, for example by adding an "address" attribute to the Customer entity. The user can use the management interface to add a mapping for the "address" attribute to the metadata. The user's underlying session can be adjusted automatically to make use of the new mapping without the need for redeployment on the application server. Subsequent retrievals using the Customer entity can use the new "address" mapping. Similarly, these new mappings can be removed or updated, without redeploying the persistence unit.

Figure 6:
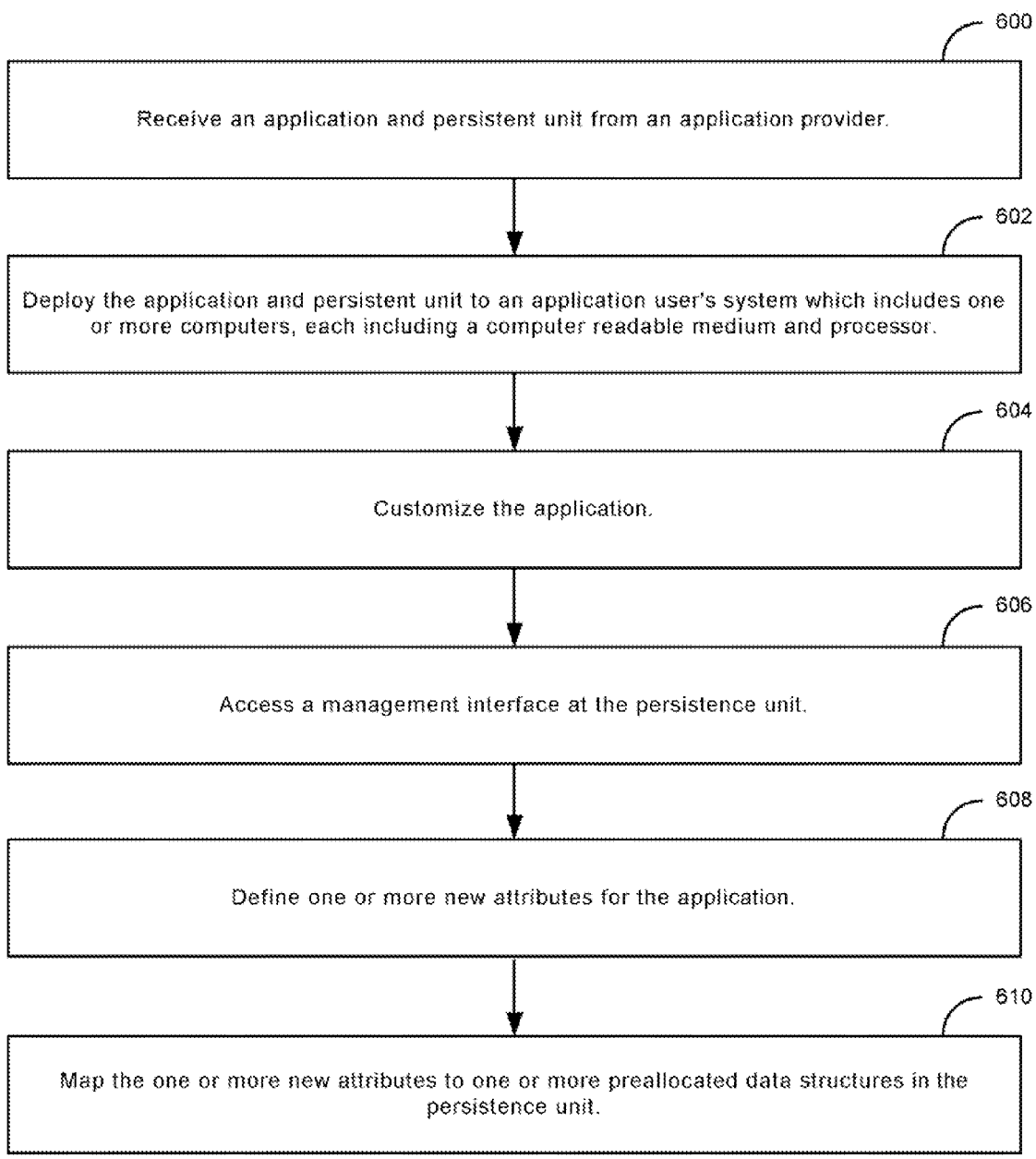
FIG. 6 shows a method for customizing extensible applications, in accordance with an embodiment.

FIG. 6 shows a method for customizing extensible applications, in accordance with an embodiment. At step 600, an application and persistence unit are received from an application provider. At step 602, the application and persistent unit are deployed to an application user's system which includes one or more computers, each including a computer readable medium and processor. At step 604, the application is customized by the application user. At step 606, a management interface at the persistence unit is accessed to customize the application. At step 608, one or more new attributes are defined for the application using the management interface. At step 610, the one or more new attributes are mapped to one or more preallocated fields in the persistence unit.

Schema Design for Extensibility

As noted above, one of the differences in how an extensible application is designed, as opposed to a typical application, is in how the database schema is designed. There are several strategies that can be employed.

In accordance with an embodiment, a schema can be designed which includes one or more preallocated flexible columns that can be used to map additional data. For example, a Customer table might be represented as shown in Listing 1:

CUSTOMER
   INTEGER ID
   VARCHAR NAME
   VARCHAR FLEX_COL1
   VARCHAR FLEX_COL2
   VARCHAR FLEX_COL3
     Listing 1.

An arbitrary number of the columns prefixed with "FLEX COL" could be defined. Subsequently, a user could map new attributes to the flexible columns. For example, an "address" property of Customer could be mapped to FLEX_COL1. In order to support multiple data types, flexible columns can be defined as strings. Metadata about the expected type of the field can be defined in the database. For each flexible column, a database table can be maintained which includes one or more entries. The table and column names storing these items can be defined by the application provider, and can be embodied in one or more tables.

For each flexible column, metadata can be stored which defines a label and a type. For example, the label can be the name of whatever new attribute the flexible column is being used to store, and the type can be set to an appropriate data type corresponding to that label (e.g., string, int, long, etc.).

As noted above, in accordance with an embodiment, the metadata corresponding to the flexible columns can be stored in one or more tables. For instance, for the above example, an Application Provider might choose to define a single table containing the columns shown in Listing 2.

CUSTOMER_METADATA
   FLEX_COL1_LABEL
   FLEX_COL1_TYPE
   FLEX_COL2_LABEL
   FLEX_COL2_TYPE
   FLEX_COL3_LABEL
   FLEX_COL3_TYPE
     Listing 2.

Alternatively, they might choose to define three tables, represented as shown in Listing 3.

CUSTOMER_COL1_METADATA
   FLEX_COL_LABEL
   FLEX_COL_TYPE
CUSTOMER_COL2METADATA
   FLEX_COL_LABEL
   FLEX_COL_TYPE
CUSTOMER_COL3METADATA
   FLEX_COL_LABEL
   FLEX_COL_TYPE
     Listing 3.

Additionally, or alternatively, in accordance with an embodiment, flexible tables can be used to provide extended mapping features. By using a flexible table to extend an entity, a second table is created and linked to that entity. Additional tables are provided that can be used for extensions.

For instance, as above, a CUSTOMER table can be designed and represented as shown in Listing 4.

CUSTOMER
   INTEGER ID
   VARCHAR NAME
     Listing 4.

An additional table, a flexible table, can also be provided in the database, as represented in Listing 5.

CUSTOMER_EXT1
   INTEGER CUST_ID
   VARCHAR FLEX_COL1
   VARCHAR FLEX_COL2
   VARCHAR FLEX_COL3
     Listing 5.

When the first extended mapping is added, CUSTOMER_EXT1 is added as a secondary table for the Customer table. The address field, can then be mapped to FLEX_COL1. Similarly to the flexible columns described above, an arbitrary number of columns prefixed with "FLEX_COL" can be provided in the flexible table. Additionally, each extended application could, optionally, provide its own extension table, and as a result, applications would not be forced to share unused data with other applications using the same base schema.

In accordance with an embodiment, custom columns can be added to a table in a schema, using information provided by the application user. Schemas are designed with only the tables and columns used by the predefined mappings. When a new mapping is added, the system can detect the metadata associated with the new mapping, and alter the appropriate tables to add columns for the new mapping that are added as extensions. For example, given the Customer table shown in Listing 4, when an application user adds an "address" mapping for Customer, the system inspects the metadata associated with the CUSTOMER table and can call an ALTER TABLE statement to add an ADDRESS field to the CUSTOMER table.

In accordance with an embodiment, a schema can be designed with a table that represents a map structure for mappings. This way, one map table is used for all additional mappings. Again, using the Customer table of Listing 4, an attribute table can be defined to include one or more customer attributes, as shown in Listing 6.

CUST_ATTR
   NAME
   VALUE
   CUST_ID
     Listing 6.

Similarly, metadata can be represented in a metadata table, as represented in Listing 7.

CUST_METADATA
   ATTR_NAME
   ATTR_TYPE
     Listing 7.

When a new field is added to an entity, such as an "address" field added to CUSTOMER, a new row can be added to the metadata table which includes that new field's label and type (e.g., CUST_METADATA with ATTR_NAME=address and ATTR_TYPE=VARCHAR). Any value for that attribute can be added to the attribute table with the NAME=the label of the attribute, the customer's ID and the value. Both the metadata table and the attribute table can be queried to identify mappings which are associated with a particular entity.

Figure 7:
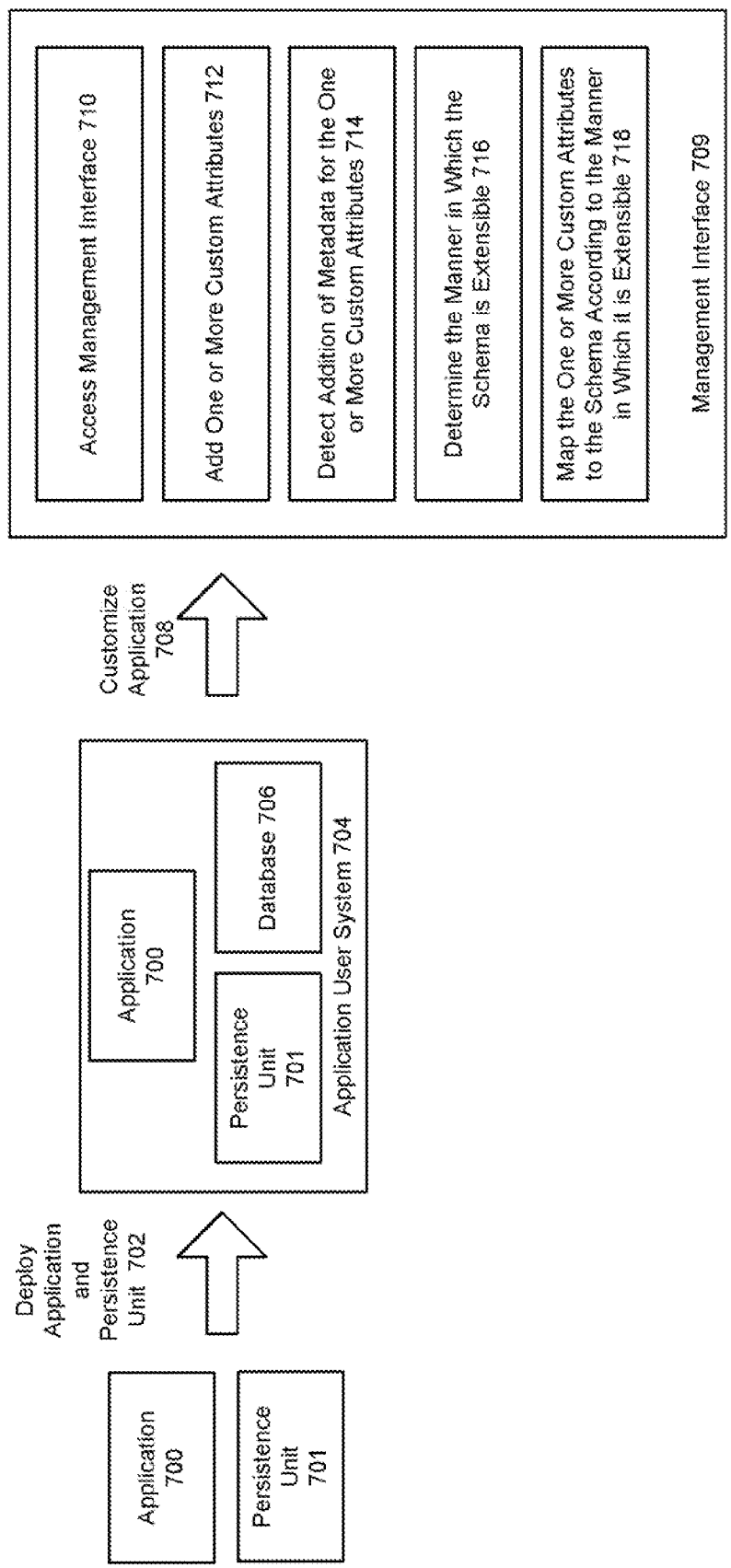
FIG. 7 shows an illustration of a system for customizing an extensible application, in accordance with an embodiment.

FIG. 7 shows a block diagram of a system for customizing an extensible application, in accordance with an embodiment. As shown in FIG. 7, an application user can receive and application 700 and a persistence unit 701 from an application provider. The application and persistence unit can be configured such that they are extensible via one or more of the features described above, such as flexible columns, flexible tables, etc.). The application user can then deploy 702 the application and persistence unit to the application user system 704. As shown in FIG. 7, the application user system includes the application and persistence unit as well as a database 706. The application user system can also include additional applications and persistence units and a plurality of servers which can be configured as a cluster. The application user can then customize 708 the application using the persistence unit's management interface 709. To do this, the application user can access the management interface 710 and add one or more custom attributes 712. In adding the custom attributes, the user can specify a label and type for each custom attribute, this information can be stored as metadata in the database. The system can then detect the addition of this metadata 716 and determine the manner in which the application and persistence unit are extensible, for example by determining that the application's schema has been configured with one or more flexible columns or flexible tables. The system can then map the custom attributes 718 as appropriate, using the flexible columns, flexible tables or other mechanism through which the application and persistence unit can be extended.

Extensible Descriptors

In accordance with an embodiment, in addition to being able to extend an application, the extensions (i.e., new mappings) can be made persistent. That is, the new mappings are stored in a persistent media so that they can be used across sessions. This can be accomplished in any of several ways, as described below.

File-based-extension

In accordance with an embodiment, persistent extension can be provided using one or more additional files, such as an additional orm.xml file, which contain the additional mappings. That file or files could be allowed through a persistence unit property when either the EntityManagerFactory or the EntityManager was created, such as by assigning the file or files a URL (e.g. extended-mappings=<URL>). At processing-time this URL is examined for an orm.xml file containing additional mappings and those additional mappings can be appended to existing descriptors.

Persistent Extensions

In accordance with an embodiment, the extensions can be stored in the database and retrieved at startup or login. A table structure like time one in the Value Rows Schema section could be used to store the metadata.

Entity Classes

Given a descriptor for dynamic mappings, the entity it refers to needs fields that can store the actual data. Preferably, extension of the application occurs without requiring that the application be redeployed. Therefore, the system can accomodate changes which are made without any prior knowledge of what mappings are to be added. Additionally, extension should be able to be accomplished without requiring the application user to modify their domain classes.

Predefined Attributes

In accordance with an embodiment, just as the database could hold predefined flexible columns, the Entities could hold predefined flexible fields to hold the data. These fields can have a one-to-one correspondence to the flexible columns. This type of column is that we can have a predefined Object type for it. As a result, it can hold a composite data structure that can read a String value and apply conversion based on the expected type stored in the database.

Attributes as a Map

In accordance with an embodiment, a list of dynamically added attributes can be stored in a Map. The map could be provided in the Entity class by the Application Provider and described in the metadata for the Entity, or it could be woven into the class for any Entity that allows dynamic mappings. One or more different maps could be used, such as a Name-Value Map or a Metadata-Value Map. The Name-Value Map uses the name of the attribute as the key and the value is its value. In the Metadata Holder-Value Map, the key of the map is a data structure that holds metadata about the attribute including its name, its data type and any other required information.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for customizing extensible applications, comprising:
   a computer, including a computer readable medium and processor;
   one or more servers executing on the computer;
   a database accessible to the one or more servers;
   a persistence unit, which includes a JPA management interface which implements the Java Persistence API framework (JPA), and is accessible to the one or more servers;
   an application which includes a plurality of default attributes and a schema which maps said plurality of default attributes to a plurality of data structures; and
   a plurality of preallocated data structures within said schema which are not mapped to said plurality of default attributes;
   wherein the application is deployed to said one or more servers and wherein the schema and the plurality of default attributes are stored in the database; and
   wherein the application is configured to be customized after deployment to said one or more servers, wherein customizing includes accessing the JPA management interface at the persistence unit,
allowing definition of one or more new attributes for the application using the JPA management interface of the persistence unit,
automatically determining that one or more new attributes for the application have been defined,
modifying said schema with one or more new entries corresponding to the one or more new attributes, and
mapping, in the persistence unit, the one or more new attributes to one or more of said plurality of preallocated data structures within said schema which are not mapped to said plurality of default attributes.

2. The system of claim 1, wherein said plurality of preallocated data structures within said schema which are not mapped to said plurality of default attributes comprises one or more flexible columns within said schema associated with the application.

3. The system of claim 1, wherein said plurality of preallocated data structures within said schema which are not mapped to said plurality of default attributes comprises one or more flexible tables stored in a database and linked to said schema associated with the application.

4. The system of claim 1, wherein the persistence unit comprises:
an object-persistence and object transformation framework which stores persistent object-oriented data in a relational database; and can be used to transform object oriented data into relational data or Extensible Markup Language (XML) elements.

5. The system of claim 1 further comprising:
storing a record of mapping the one or more new attributes to one or more of said preallocated data structures within said schema which are not mapped to said plurality of default attributes in a persistent medium such that they are accessible across different sessions.

6. The system of claim 1 wherein defining one or more new attributes for the application comprises:
defining metadata for each of the one or more new attributes including a label and a type; and
storing the metadata in a database.

7. The system of claim 1, wherein mapping of the one or more new attributes to one or more of said plurality of preallocated data structures within said schema which are not mapped to said plurality of default attributes in the persistence unit can be performed dynamically while said application is running.

8. The system of claim 1, wherein said customizing does not require writing of any programming language or SQL code.

9. A method for customizing extensible applications, comprising:
receiving an application and persistence unit and a schema from an application provider, wherein the persistence unit includes a JPA management interface which implements the Java Persistence API framework (JPA), and wherein the application includes a plurality of default attributes, and wherein the schema maps said plurality of default attributes to a plurality of data structures and also includes a plurality of preallocated data structures which are not mapped to said plurality of default attributes;
deploying the application and persistence unit to an application user's system which includes one or more computers, each including a computer readable medium and processor; and
customizing the application after deployment, wherein customizing includes
accessing the JPA management interface at the persistence unit,
allowing definition of one or more new attributes for the application using the JPA management interface of the persistence unit,
automatically determining that one or more new attributes for the application have been defined,
modifying said schema with one or more new entries corresponding to the one or more new attributes, and
mapping, in the persistence unit, the one or more new attributes to one or more of said plurality of preallocated data structures within said schema which are not mapped to said plurality of default attributes.

10. The method of claim 9, wherein said plurality of preallocated data structures within said schema which are not mapped to said plurality of default attributes comprises one or more flexible columns within said schema of said application.

11. The method of claim 9, wherein said plurality of preallocated data structures within said schema which are not mapped to said plurality of default attributes comprises one or more flexible tables stored in a database and linked to said schema associated with the application.

12. The method of claim 9, wherein the persistence unit comprises:
an object-persistence and object transformation framework which stores persistent object-oriented data in a relational database; and can be used to transform object oriented data into relational data or Extensible Markup Language (XML) elements.

13. The method of claim 9 further comprising:
storing a record of mapping the one or more new attributes to one or more of said plurality of preallocated data structures which are not mapped to said plurality of default attributes in a persistent medium such that they are accessible across different sessions.

14. The method of claim 9 wherein defining one or more new attributes for the application comprises:
defining metadata for each of the one or more new attributes including a label and a type; and
storing the metadata in a database.

15. A non-transitory computer readable storage medium, including instructions stored thereon which, when executed by a computer, cause the computer to perform the steps comprising:
receiving an application and persistence unit and a schema from an application provider, wherein the persistence unit includes a JPA management interface which implements the Java Persistence API framework (JPA), and wherein the application includes a plurality of default attributes, and wherein the schema maps said plurality of default attributes to a plurality of data structures and also includes a plurality of preallocated data structures which are not mapped to said plurality of default attributes;
deploying the application and persistence unit to an application user's system which includes one or more computers, each including a computer readable medium and processor; and
customizing the application after deployment, wherein customizing includes
accessing the JPA management interface at the persistence unit,
allowing definition of one or more new attributes for the application using the JPA management interface of the persistence unit,
automatically determining that one or more new attributes for the application have been defined, modifying said schema with one or more new entries corresponding to the one or more new attributes, and mapping, in the persistence unit, the one or more new attributes to one or more of said plurality of preallocated data structures within said schema which are not mapped to said plurality of default attributes.

16. The non-transitory computer readable storage medium of claim 15, wherein said plurality of preallocated data structures within said schema which are not mapped to said plurality of default attributes comprises one or more flexible columns within said schema associated with the application.

17. The non-transitory computer readable storage medium of claim 15, wherein said plurality of preallocated data structures within said schema which are not mapped to said plurality of default attributes comprises one or more flexible tables stored in a database and linked to said schema associated with the application.

18. The non-transitory computer readable storage medium of claim 15, wherein the persistence unit comprises:

an object-persistence and object transformation framework which stores persistent object-oriented data in a relational database; and can be used to transform object oriented data into relational data or Extensible Markup Language (XML) elements.

19. The non-transitory computer readable storage medium of claim 15 further comprising:

storing a record of mapping the one or more new attributes to one or more of said plurality of preallocated data structures within said schema which are not mapped to said plurality of default attributes in a persistent medium such that they are accessible across different sessions.

20. The non-transitory computer readable storage medium of claim 15 wherein defining one or more new attributes for the application comprises:

defining metadata for each of the one or more new attributes including a label and a type; and storing the metadata in a database.

* * * * *

UNITED STATES PATENT AND TRADEMARK OFFICE
CERTIFICATE OF CORRECTION

| | |
|---|---|
| PATENT NO. | : 8,954,461 B2 |
| APPLICATION NO. | : 13/332110 |
| DATED | : February 10, 2015 |
| INVENTOR(S) | : Ware et al. |

Page 1 of 1

It is certified that error appears in the above-identified patent and that said Letters Patent is hereby corrected as shown below:

In the Specification

In column 7, lines 22-23, delete ""FLEX COL"" and insert -- "FLEX_COL" --, therefor.

In column 9, lines 51-52, delete "accomodate" and insert -- accommodate --, therefor.

Signed and Sealed this
Twenty-fourth Day of November, 2015

Michelle K. Lee
*Director of the United States Patent and Trademark Office*